United States Patent
Calvignac et al.

(10) Patent No.: US 6,658,546 B2
(45) Date of Patent: Dec. 2, 2003

(54) STORING FRAME MODIFICATION INFORMATION IN A BANK IN MEMORY

(75) Inventors: Jean Louis Calvignac, Cary, NC (US); Marco C. Heddes, Raleigh, NC (US); Joseph Franklin Logan, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 09/792,557

(22) Filed: Feb. 23, 2001

(65) Prior Publication Data

US 2002/0118693 A1 Aug. 29, 2002

(51) Int. Cl.$^7$ .......................... G06F 12/00; H04L 12/54
(52) U.S. Cl. ........................................ 711/170; 370/429
(58) Field of Search ................................. 711/153, 170; 370/389, 412, 428, 429, 901, 912

(56) References Cited

U.S. PATENT DOCUMENTS

| | | | |
|---|---|---|---|
| 4,958,302 A | 9/1990 | Fredrickson et al. | 364/521 |
| 4,961,153 A | 10/1990 | Fredrickson et al. | 364/521 |
| 5,001,571 A | 3/1991 | Murano | 358/434 |
| 5,056,044 A | 10/1991 | Fredrickson et al. | 364/521 |
| 5,131,080 A | 7/1992 | Fredrickson et al. | 395/164 |
| 5,170,468 A | 12/1992 | Shah et al. | 395/166 |
| 5,257,237 A | 10/1993 | Aranda et al. | 365/230.05 |
| 5,561,785 A | 10/1996 | Blandy et al. | 395/497.01 |
| 5,664,139 A | 9/1997 | Spurlock | 711/202 |
| 5,729,303 A | 3/1998 | Oku et al. | 348/716 |
| 6,032,190 A | * 2/2000 | Bremer et al. | 709/238 |
| 6,064,404 A | 5/2000 | Aras et al. | 345/507 |
| 6,104,753 A | 8/2000 | Kim et al. | 375/240 |

* cited by examiner

*Primary Examiner*—Matthew Kim
*Assistant Examiner*—Woo H. Choi
(74) *Attorney, Agent, or Firm*—Winstead, Sechrest & Minick

(57) ABSTRACT

A method and system for reserving frame modification information in a data storage unit. In one embodiment of the present invention, a system comprises a processor configured to process frames of data. The processor may comprise a data flow unit configured to receive and transmit frames of data. The processor may further comprise a data storage unit coupled to the data flow unit where the data storage unit comprises a plurality of buffers. The plurality of buffers is configured to store frames of data. A first buffer may be accessed to store the ending frame data of a first frame. A first bank in the first buffer stores the end of the first frame. A second bank in a second buffer may be reserved for storing frame modification information where the second bank corresponds to the first bank in the first buffer that stores the end of the first frame.

13 Claims, 6 Drawing Sheets

US 6,658,546 B2

STORING FRAME MODIFICATION INFORMATION IN A BANK IN MEMORY

CROSS REFERENCE TO RELATED APPLICATIONS

The present invention is related to the following U.S. Patent Applications which are incorporated herein by reference:

Ser. No. 09/792,494 entitled "Assignment of Packet Descriptor Field Positions in a Network Processor" filed Feb. 23, 2001.

Ser. No. 09/79 1,336 entitled "Linking Frame Data by Inserting Qualifiers in Control Blocks" filed Feb. 23, 2001.

Ser. No. 09/792,533 entitled "Efficient Implementation of Error Correction Code Scheme" filed Feb. 23, 2001.

TECHNICAL FIELD

The present invention relates to the field of a networking communication system, and more particularly to reserving a bank in memory for the storage of frame modification data instead of storing frame modification data in a field of a frame control block.

BACKGROUND INFORMATION

A packet switching network has switching points or nodes for transmission of data among senders and receivers connected to the network. The switching performed by these switching points is in fact the action of passing on packets or "frames" of data received by a switching point or node to a further node in the network. Such switching actions are the means by which communication data is moved through the packet switching network.

Each node may comprise a packet processor configured to process packets or frames of data. Each frame of data may be associated with a Frame Control Block (FCB) configured to describe the associated frame of data. Typically, FCBs comprise various fields of information where the fields of information are supplied by a memory, e.g., Quadruple Data Rate Static Random Access Memory (QDR SRAM), in the packet processor. That is, the fields of information in FCBs are obtained by accessing the memory, e.g., QDR SRAM, in the packet processor. Typically, the fields of an FCB may comprise frame control information and frame modification information.

It would therefore be desirable to limit the number of fields in field control blocks thereby reducing the number of memory accesses and improving memory space efficiency, i.e., efficiency of the bandwidth of the memory storing field information.

SUMMARY

The problems outlined above may at least in part be solved in some embodiments by reserving a bank in a data storage unit to store frame modification information, e.g., frame modification commands, during a write access to the data storage unit that involves the storing of the ending of a first frame of data in a first buffer of the data storage unit. By reserving a bank in a data storage unit to store frame modification information FCBs do not need to include fields to store frame modification information thereby reducing the number of memory accesses and improving the efficiency of the bandwidth of the memory storing field information. Data storage unit may comprise a plurality of buffers where two buffers may be accessed during one write access. Each buffer may comprise a plurality of banks, e.g., bank A, bank B, bank C and bank D. Data may be written to the data storage unit from the top bank to the bottom bank in order. For example, if bank A is the top bank and bank D is the bottom bank, then data may be written from bank A to bank B to bank C to bank D. Since a buffer may not store different frames of data, when the end of a first frame of data is written in a bank, e.g., bank B, of a first buffer, the start of a second frame of data may be written in a subsequent bank, e.g., bank C, in a second buffer during the same access. Subsequently, a bank, e.g., bank B, in the second buffer may be reserved for storing frame modification information since frame data will not be written in that particular bank. That is, the bank in the second buffer reserved for storing frame modification information corresponds to the bank storing the end of the first frame of data in the first buffer. If the end of the first frame of data is stored in the last bank, e.g., bank D, of the first buffer, then a third buffer may be accessed to store the beginning frame data of a second frame in a second access. That is, the last bank, e.g., bank D, may be reserved for storing frame modification information in the second buffer and the beginning of the second frame of data may be stored in a third buffer in a second access.

In one embodiment, a system comprises a processor configured to process frames of data. The processor may comprise a data flow unit configured to receive and transmit frames of data. The processor may further comprise a data storage unit coupled to the data flow unit where the data storage unit comprises a plurality of buffers. The plurality of buffers may be configured to store frames of data where two buffers may be accessed during one write access. Data may be written to the data storage unit from the top bank to the bottom bank in order. For example, if bank A is the top bank and bank D is the bottom bank, then data may be written from bank A to bank B to bank C to bank D. Since a buffer may not store different frames of data, when the end of a first frame of data is written in a bank, e.g., bank B, of a first buffer, the start of a second frame of data may be written in a subsequent bank, e.g., bank C, in a second buffer during the same access. Subsequently, a bank, e.g., bank B, in the second buffer may be reserved for storing frame modification information since frame data will not be written in that particular bank. That is, the bank in the second buffer reserved for storing frame modification information corresponds to the bank storing the end of the first frame of data in the first buffer.

In another embodiment of the present invention, if the end of the first frame of data is stored in the last bank, e.g., bank D, of the first buffer storing the ending of the first frame of data, then a third buffer may be accessed to store the beginning frame data of a second frame in a second access.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for reserving frame modification information in a data storage unit. In one embodiment, a system comprises a processor configured to process frames of data. The processor may comprise a data flow unit configured to receive and transmit frames of data. The processor may further comprise a data storage unit coupled to the data flow unit where the data storage unit comprises a plurality of buffers. The plurality of buffers is configured to store frames of data where two buffers may be accessed during one write access. Data may be written to the data storage unit from a top bank to the bottom bank in order. For example, if bank A is the top bank and bank D is the bottom bank, then data may be written from bank A to bank B to bank C to bank D. Since a buffer may not store different frames of data, when the end of a first frame of data is written in a bank, e.g., bank B, of a first buffer, the start of a second frame of data may be written in a subsequent bank, e.g., bank C, in a second buffer during the same access. Subsequently, a bank, e.g., bank B, in the second buffer may be reserved for storing frame modification information since frame data will not be written in that particular bank. That is, the bank in the second buffer reserved for storing frame modification information corresponds to the bank storing the end of the first frame of data in the first buffer. In another embodiment of the present invention, if the end of the first frame of data is stored in the last bank, e.g., bank D, of the first buffer storing the ending of the first frame of data, then a third buffer may be accessed to store the beginning frame data of a second frame in a second access.

Figure 1:
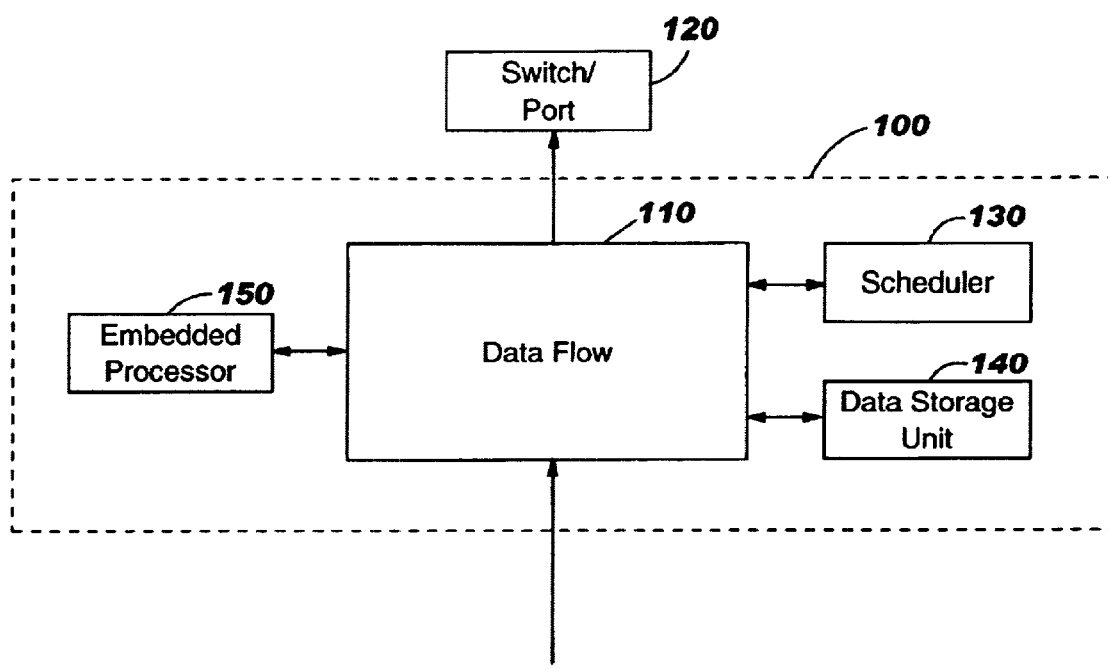
FIG. 1 illustrates a packet processor configured in accordance with the present invention.

FIG. 1—Packet Processor

FIG. 1 illustrates an embodiment of the present invention of a packet processor 100. Packet processor 100 may comprise a data flow unit 110 configured to receive digital packets, i.e., frames, of data, from a particular switch (not shown) or port (not shown) of a packet switching network and transmit the digital packets, i.e., frames, of data to another switch or port, e.g., switch/port 120, in the packet switching network. Each frame of data may be associated with a Frame Control Block (FCB) where the FCB describes the associated frame of data. Each FCB associated with a frame of data may be associated with one or more Buffer Control Blocks (BCBs) where each BCB associated with an FCB may be associated with a buffer in a data storage unit 140. A BCB may be configured to describe the buffer associated with the next chained BCB as described in U.S. application Ser. No. 09/791,336, filed on Feb. 23, 2001, entitled "Linking Frame Data by Inserting Qualifiers in Control Blocks," which is hereby incorporated herein by reference in its entirety. In one embodiment, data flow unit 110 may reside on an integrated circuit, i.e., integrated chip. Data flow unit 110 may be coupled to data storage unit 140 configured to temporarily store frames of data received by data flow unit 110 from a switch (not shown) or port (not shown) in the packet switching network. Data flow unit 110 may further be coupled to a scheduler 130 configured to schedule frames of data to be transmitted from data flow unit 110 to switch/port 120. In one embodiment, scheduler 130 may reside on an integrated circuit, i.e., integrated chip. Furthermore, data flow unit 110 may further be coupled to an embedded processor 150 configured to process frames of data received by data flow unit 110.

Figure 2:
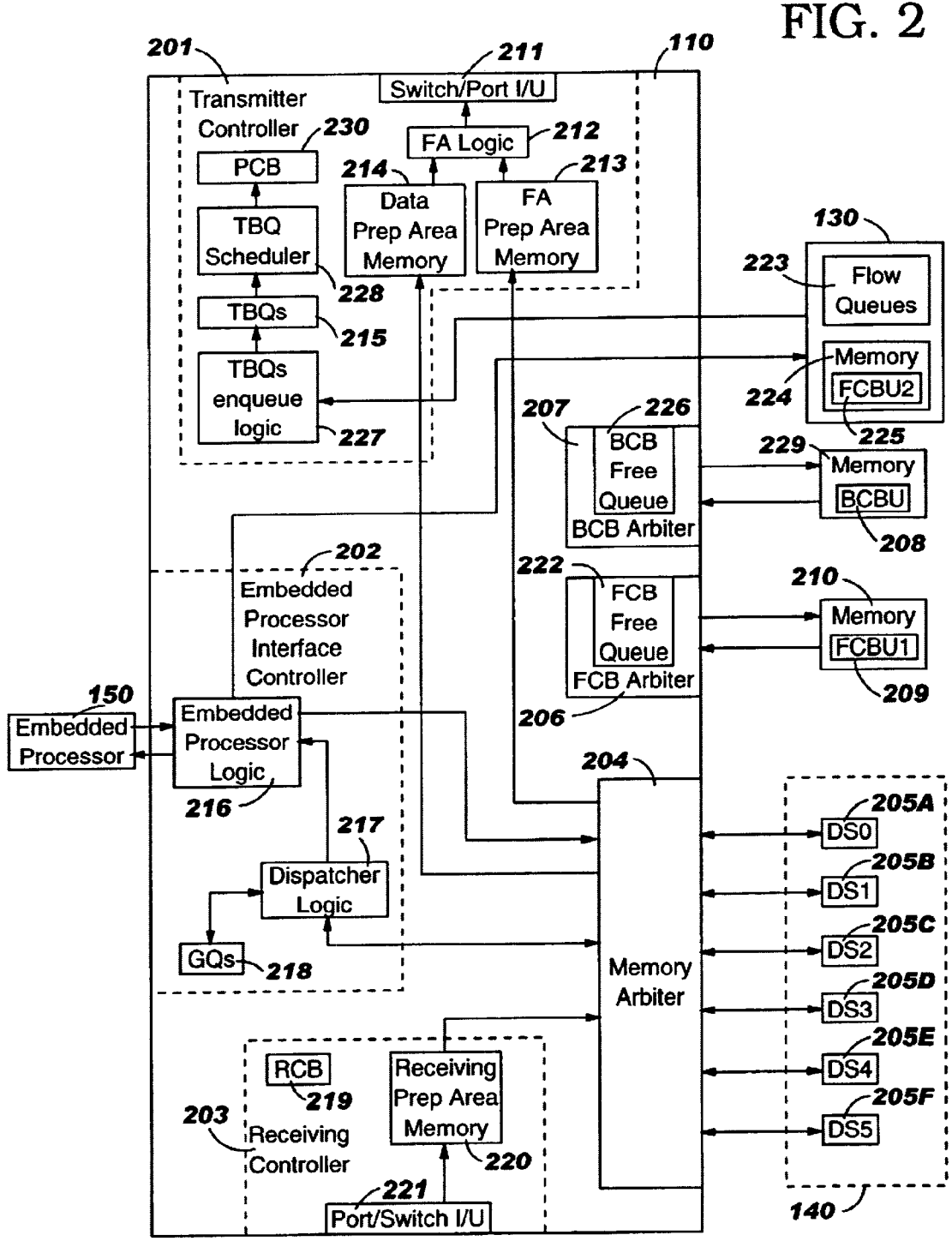
FIG. 2 illustrates a data flow unit configured in accordance with the present invention.

FIG. 2—Data Flow Unit

FIG. 2 illustrates an embodiment of the present invention of data flow unit 110. Data flow unit 110 may comprise a receiver controller 203 configured to receive and temporarily store packets, i.e., frames, of data received from a switch (not shown) or port (not shown) in a packet switching network. Data flow unit 110 may further comprise a transmitter controller 201 configured to modify the frame data as well as transmit the modified frame data to a switch (not shown) or port (not shown) in a packet switching network. Data flow unit 110 may further comprise an embedded processor interface controller 202 configured to exchange frames to be processed by embedded processor 150.

Packets, i.e., frames, of data may be received by a port/switch interface unit 221. Port/switch interface unit 221 may receive data from a switch (not shown) in the packet switching network when data flow unit 110 operates in an egress mode. Otherwise, port/switch interface unit 221 may receive data from a port (not shown) that operates as an interface to the packet switching network when data flow unit 110 operates in an ingress mode. Data received by data flow unit 110 may be temporarily stored in a receiving preparation area memory 220 prior to being stored in data storage unit 140 which may be represented by a plurality of slices 205A–F. Slices 205A–F may collectively or individually be referred to as slices 205 or slice 205, respectively. The number of slices 205 in FIG. 2 is illustrative, and an embodiment of data flow unit 110 in accordance with the principles of the present invention may have other predetermined number of slices 205. Each slice may comprise a plurality of buffers. Each slice may represent a slice of memory, e.g., Dynamic Random Access Memory (DRAM), so that frame data may be written into different buffers in different slices in order to maximize memory bandwidth. A memory arbiter 204 may be configured to collect requests, e.g., read, write, from receiver controller 203, transmitter controller 201 and embedded processor interface controller 202 and subsequently schedule access to particular data store memory slices, i.e., particular buffers in particular slices 205. For example, receiver controller 203 may be configured to issue write requests to memory arbiter 204 in order to write received data into individual buffers in a particular slice 205.

As stated above, frame data may be stored in data storage unit 140, i.e., a plurality of slices 205. In one embodiment, frame data may be stored in one or more buffers in one or more slices 205 in a manner such that the data in each particular frame may be recomposed by having the buffers chained together. That is, data in a particular frame may be stored in one or more buffers that are chained together in the order that data is written into the one or more buffers. The chaining of the one or more buffers may be controlled by a Buffer Control Block Unit (BCBU) 208 in a memory 229, e.g., Quadruple Data Rate Static Random Access Memory (QDR SRAM), coupled to data flow unit 110. BCBU 208 may be configured to comprise the addresses of each of the one or more buffers chained together in the order data was written into buffers. The different buffers comprising data of the same frames may be linked together by means of pointers stored in BCBU 208.

As stated above, each frame of data may be associated with a Frame Control Block (FCB) where the FCB describes the associated frame of data. Frame Control Block Unit 1 (FCBU1) 209 in a memory 210, e.g., QDR SRAM, may be configured to store the information, e.g., frame control information, to be filled in the fields of the FCBs. That is, the fields of information in FCBs may be obtained by accessing memory 210, i.e., FCBU1 209 of memory 210. Additional details regarding FCBU1 209 of memory 210 storing fields of information are disclosed in U.S. patent application Ser. No. 09/792,494 filed on Feb. 23, 2001, entitled "Assignment of Packet Descriptor Field Positions in a Network Processor," which is hereby incorporated herein by reference in its entirety. As stated in the Background Information section, FCBs typically comprise both frame control information and frame modification information. It would therefore be desirable to limit the number of fields in FCBs in order to reduce the number of accesses to memory 210, i.e., FCBU1 209 of memory 210, and therefore improve the efficiency of the bandwidth of memory 210 The number of fields in FCBs may be limited by reserving frame modification information to be stored in data storage unit 140 instead of storing frame modification information in memory 210, i.e., FCBU1 209 of memory 210, as will be described in greater detail in the description of FIG. 4. Thus, FCBs need not comprise fields storing frame modification information thereby reducing accesses to memory 210, i. e., FCBU1 209 of memory 210, and improving the efficiency of the bandwidth of memory 210.

Frame data stored in buffers may be processed by embedded processor 150 by transmitting the header of each frame to be processed to embedded processor 150. As stated above, each frame of data may be represented by an FCB. These FCBs may be temporarily stored in G Queues (GQs) 218. Dispatcher logic 217 may be configured to dequeue the next FCB from GQs 218. Once dispatcher logic 217 dequeues the next FCB, dispatcher logic 217 issues a read request to memory arbiter 204 to read the data at the beginning of the frame, i.e., header of the frame, stored in data storage unit 140 associated with the dequeued FCB. The data read by dispatcher logic 217 is then processed by embedded processor 150.

Once frame data has been processed by embedded processor 150, the processed frame data may be temporarily stored in data storage unit 140, i.e., slices 205, by embedded processor logic 216 issuing a write request to memory arbiter 204 to write the processed frame data into individual buffers in one or more slices 205.

Once frame data has been processed by embedded processor 150, embedded processor logic 216 further issues the FCB associated with the processed frame to scheduler 130. Scheduler 130 may be configured to comprise flow queues 223 configured to store FCBs. Scheduler 130 may further comprise a Frame Control Block Unit 2 (FCBU2) 225 within a memory 224, e.g., QDR SRAM, configured to operate similarly as FCBU1 209. FCBU2 225 may be configured to store the information to be filled in the fields of the FCBs when the FCBs are temporarily residing in flow queues 223. Additional details regarding FCBU2 225 within memory 224 of scheduler 130 storing fields of information are disclosed in U.S. patent application Ser. No. 09/791,336, filed on Feb. 23, 2001, entitled "Assignment of Packet Descriptor Field Positions in a Network Processor." Scheduler 130 may be configured to transmit the FCBs stored in flow queues 223 to Target Blade Queues (TBQs) enqueue logic 227 configured to enqueue the received FCBs in TBQs 215.

FCBs queued in TBQs 215 may be scheduled to be dequeued from TBQs 215 by TBQ scheduler 228 and loaded into Port Control Block (PCB) 230. TBQ scheduler 228 may be configured to dequeue the next FCB from TBQs 215 and enqueue that FCB into PCB 230. Once the next FCB is enqueued into PCB 230, PCB 230 may issue a read request to memory arbiter 204 to read the data at the beginning of the frame, i.e., header of the frame, stored in data storage unit 140 associated with the dequeued FCB. The data read by PCB 230 may be temporarily stored in data preparation area memory 214 prior to transmitting the processed frame data to a switch (not shown) or port (not shown) in a packet switching network. It is noted for clarity that PCB 230 may be configured to read a portion of the data stored in the processed frame in each particular read request. That is, the entire data stored in the processed frame may be read in multiple read requests provided by PCB 230. Once the entire data stored in the processed frame is read, the data storage unit 140 may store additional frame data.

Transmitter controller 201 may further comprise a frame alteration preparation area memory 213 configured to receive commands to modify the processed frames temporarily stored in data preparation area memory 214. These commands are commonly referred to as frame modification commands which are issued by embedded processor 150 and stored in a particular bank in a particular buffer by embedded processor logic 216 as will be described in greater in the detailed description of FIG. 4. In one embodiment, PCB 224 may be configured to retrieve the frame modification commands stored in a particular bank in a particular buffer and store them in frame alteration preparation area memory 213. A Frame Alteration (FA) logic unit 212 may be configured to execute the commands stored in frame alteration preparation area memory 213 to modify the contents of the processed frames temporarily stored in data preparation area memory 214. Once FA logic 212 has modified the contents of the processed frames, the modified processed frames may be transmitted through a switch/port interface unit 211. Switch/port interface unit 211 may transmit data to a port (not shown) that operates as an interface to the packet switching network when data flow unit 110 operates in an egress mode. Otherwise, switch/port interface unit 211 may transmit data to a switch (not shown) in the packet switching network when data flow unit 110 operates in an ingress mode.

Data flow unit 110 may further comprise a Buffer Control Block (BCB) Arbiter 207 configured to arbitrate among different BCB requests from transmitter controller 201, embedded processor interface controller 202 and receiver controller 203 to read from or write to BCBU 208. BCB Arbiter 207 may be configured to schedule different accesses in order to utilize memory bandwidth as efficiently as possible. Data flow unit 110 may further comprise a Frame Control Block (FCB) Arbiter 206 configured to arbitrate among different FCB from embedded processor interface controller 202, receiver controller 203 and transmitter controller 201 to read from or write to FCBU1 209.

As stated above, each frame of data may be associated with an FCB. As the processed frames are read from data storage unit 140, e.g., DDR DRAM, and the processed frames are modified and transmitted to a switch (not shown) or a port (not shown) in the packet switching network, the FCB associated with such processed frame ceases to represent that particular frame of data. Once the FCB is no longer associated with frame data, the FCB may be stored in a FCB free queue 222 within FCB Arbiter 206. FCB free queue 222 may be configured to comprise a plurality of FCBs that are no longer associated with particular frame data. It is noted that FCB free queue 222 may comprise any number of FCBs that are no longer associated with particular frame data. Once data flow unit 110 receives a packet, i.e., frame, of data, a Reassembly Control Block (RCB) 219 of receiver controller 203 may associate a particular FCB from FCB free queue 222 with the received frame of data where the newly associated FCB may then be queued in GQs 218 by RCB 219.

As stated above, each frame of data may be associated with an FCB. Each FCB associated with a frame of data may be associated with one or more BCBs where each BCB associated with an FCB may be associated with a particular buffer of data storage 140. A BCB may be configured to describe the buffer associated with the next BCB. Once the processed frame data stored in a buffer of data storage unit 140 has been retrieved by transmitter controller 201 and subsequently modified and transmitted to a switch (not shown) or port (not shown) in the packet switching network, the BCB associated with that particular buffer that no longer includes any frame data ceases to comprise any valid information. That is, the BCB associated with the particular buffer that no longer includes any frame data includes data that is not useful since the particular buffer associated with the BCB no longer includes any frame data. Once the BCB ceases to comprise any valid information, i.e., once the frame data in a particular buffer has been transmitted, the BCB may be stored in a BCB free queue 226 within BCB Arbiter 206. BCB free queue 226 may be configured to comprise a plurality of BCBs that do not comprise any valid information. It is noted that BCB free queue 226 may comprise any number of BCBs that do not comprise any valid information. Once receiver controller 203 writes received frame data in a particular buffer of data storage unit 140, BCB 219 of receiver controller 203 may write valid information in the particular BCB in BCB free queue 226 that is associated with the particular buffer that stored the received frame of data.

As stated above, an FCB may temporarily reside in FCB free queue 222 or may temporarily reside in one of the other queues, e.g., GQs 218, flow queues 223, TBQs 215. A more detailed description of the "life cycle" of the FCB where an FCB may be initially stored in FCB free queue 222 and transferred through queues, e.g., GQs 218, flow queues 223, TBQs 215, until being enqueued in FCB free queue 222 is provided in U.S. patent application Ser. No. 09/791,336, filed on Feb. 23, 2001, entitled "Assignment of Packet Descriptor Field Positions in a Network Processor."

Figure 3:
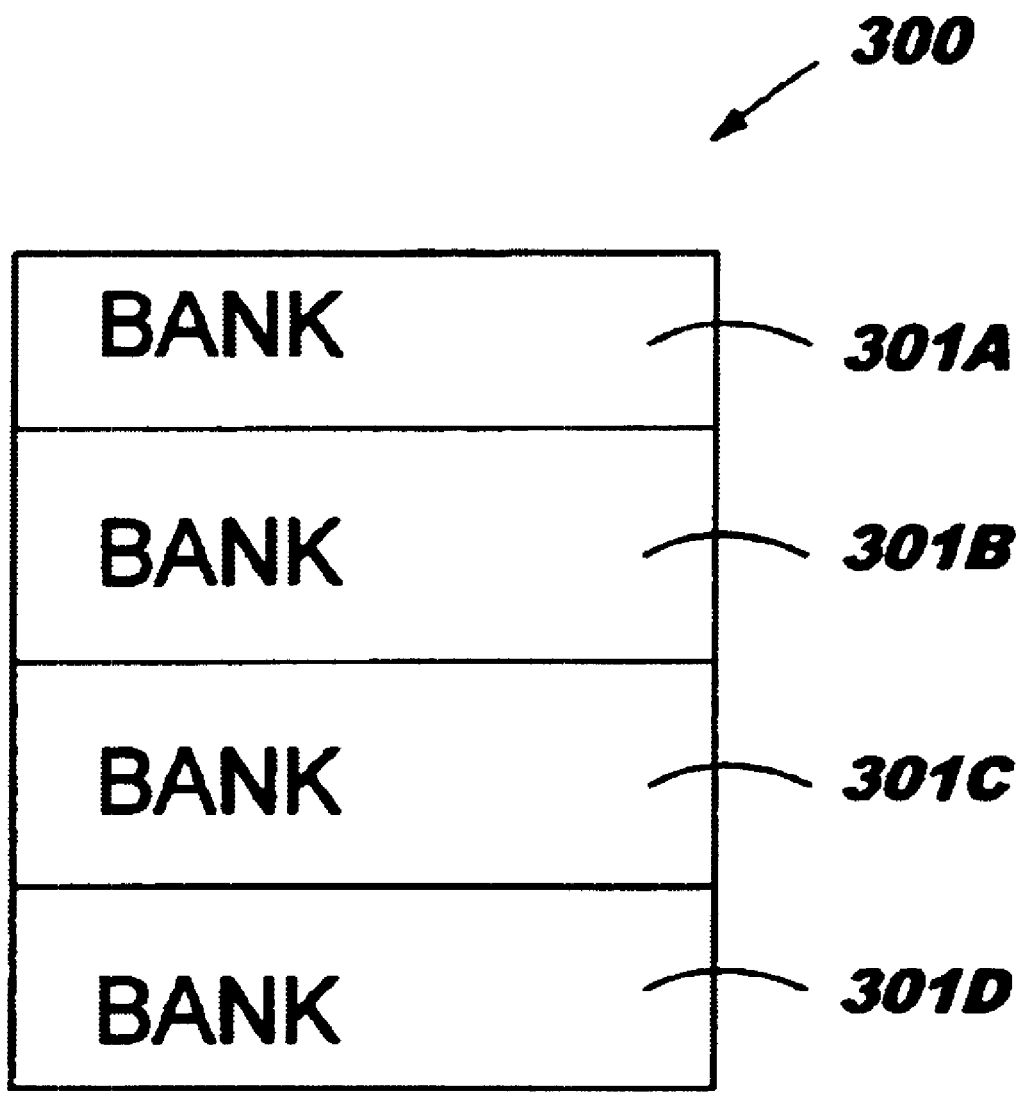
FIG. 3 illustrates a buffer of a data storage unit configured in accordance with the present invention.

FIG. 3—Buffers in Data Storage Unit

FIG. 3 illustrates an embodiment of the present invention of each buffer 300 in data storage unit 140 where data storage unit 140 comprises a plurality of slices 205 where each slice 205 comprises a plurality of buffers 300. Each buffer 300 in data storage unit 140 may comprise a plurality of banks 301A–D. Banks 301A–D may collectively or individually be referred to as banks 301 or bank 301, respectively. It is noted that each buffer 300 may comprise any number of banks 301 and that FIG. 3 illustrative.

In one embodiment, frame data may be contiguously written in a buffer 300 of data storage unit 140 from bank 301A to bank 301B to bank 301C to bank 301D. In one embodiment, buffer 300 may not store different frames of data. When the end of a first frame of data is written in a particular bank 301 of a particular buffer 300, the start of the following frame of data is written in the following bank 301 in another buffer 300. For example, if bank 301B of a particular buffer 300 stores the end of a first frame of data then bank 301C of another buffer 300 stores the start of the of a second frame of data.

As stated above, receiver controller 203 may receive packets, i.e., frames, of data by a port/switch interface unit 221 from a switch (not shown) or a port (not shown) in a packet switching network. The data received by receiver controller 203 may be temporarily stored in a receiving preparation area memory 220 prior to being stored one or more buffers 300 in data storage unit 140.

Figure 4:
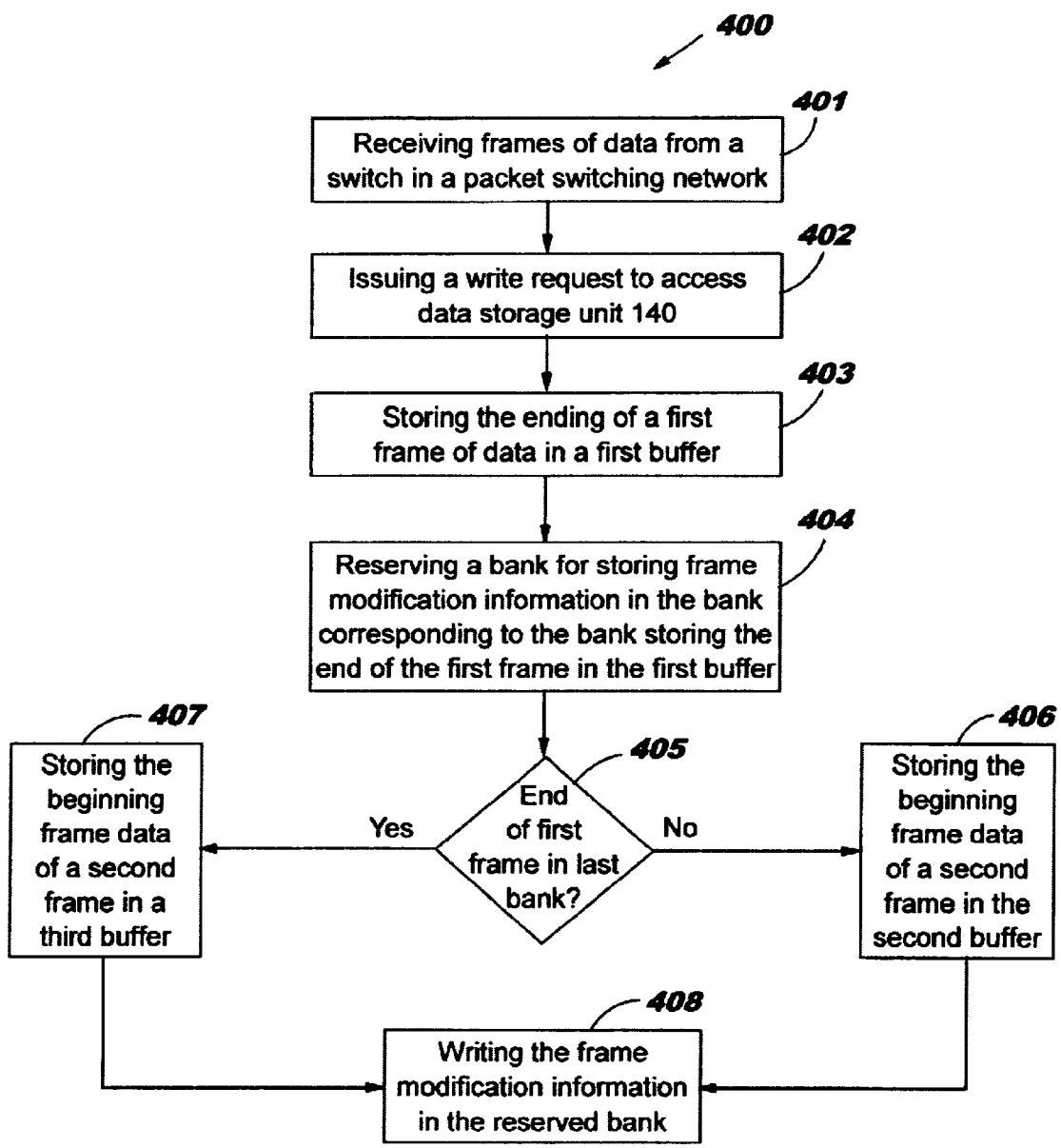
FIG. 4 is a flowchart of a method for reserving frame modification data in a data storage unit.

FIG. 4—Method for Reserving Frame Modification Data in Data Storage Unit

FIG. 4 illustrates a flowchart of one embodiment of the present invention of a method 400 for reserving frame modification information in data storage unit 140. As stated in the Background Information section, FCBs may comprise various fields of information where the fields of information are stored in a memory, e.g., memory 210. Typically, the fields of an FCB may comprise frame control information and frame modification information. It would be desirable to limit the number of fields in frame control blocks thereby reducing the number of memory accesses to memory 210, e.g., QDR SRAM, and improving the efficiency of the bandwidth of memory 210, e.g., QDR SRAM. FCBs may be configured to not comprise fields for storing frame modification information thereby reducing the number of memory accesses to memory 210, e.g., QDR SRAM, and improving the efficiency of the bandwidth of memory 210, e.g., QDR SRAM. Instead of storing frame modification information in the fields of the FCBs, a bank 301 in a particular buffer 300 of data storage unit 140 may be reserved for storing frame modification information. Method 400 is a method for reserving a particular bank 301 in a particular buffer 300 of data storage unit 140 to store frame modification information during one or more accesses to store the ending of a first frame of data and the beginning of a second frame of data as described below.

Referring to FIG. 4, in conjunction with FIGS. 1–3, in step 401, data flow unit 110 may receive packets, i.e., frames, of data by a port/switch interface unit 221 of receiver controller 203 from a switch (not shown) or a port (not shown) in a packet switching network. As stated above, data received by data flow unit 110 may be temporarily stored in a receiving preparation area memory 220 prior to being stored in one or more buffers 300 in data storage unit 140. Receiver controller 203 may issue a write request to memory arbiter 204 to access data storage unit 140 in order to write received frame data into one or more buffers 300 of data storage unit 140. In one embodiment, a memory access, i.e., access to data storage unit 140, may enable receiver controller 203 to access multiple buffers 300 of data storage unit 140.

In step 402, receiver controller 203 may issue a write request to memory arbiter 204 to access data storage unit 140 in order to write received frame data into one or more buffers 300 of data storage unit 140. In one embodiment, receiver controller 203 may be configured to issue a write request to memory arbiter 204 to access multiple buffers 300, e.g., two different buffers 300, of data storage unit 140 during one access of data storage unit 140. That is, one access to data storage unit 140 may comprise accessing multiple buffers 300, e.g., two different buffers 300. As stated above, method 400 may involve the situation when receiver controller 203 accesses data storage unit 140 to store the ending of a first frame of data and the start of a second frame of data during one or more accesses. In one embodiment, frame data may be written in a buffer 300 of data storage unit 140 from bank 301A to bank 301B to bank 301C to bank 301D. When the end of a first frame of data is written in a particular bank 301 of a particular buffer 300, the start of the following frame of data is written in the following bank 301 in another buffer 300. For example, if bank 301B of a particular buffer 300 stores the end of a first frame of data then bank 301C of another buffer 300 stores the start of the of a second frame of data.

In step 403, receiver controller 203 may access one particular buffer 300 of data storage unit 140 to store the ending of a first frame of data. The end of the first frame of data may be stored in any particular bank 301 of the particular buffer 300. For example, the end of the first frame of data may be stored in either bank 301A (FIG. 3), bank 301B (FIG. 3), bank 301C (FIG. 3) or in bank 301D (FIG. 3).

Figure 5A:
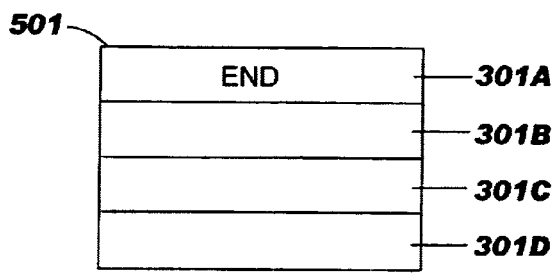
FIG. 5A illustrates one embodiment of the present invention of a reserved bank in a second buffer corresponding to the bank that stored the end of a first frame of data in a first buffer.
Figure 5B:
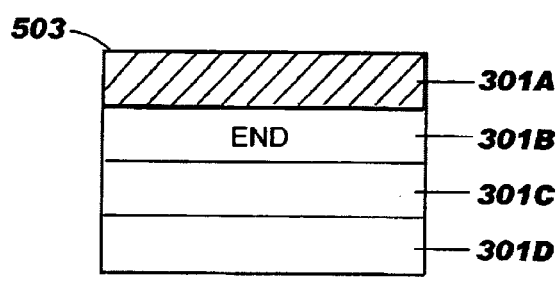
FIG. 5B illustrates another embodiment of the present invention of a reserved bank in a second buffer corresponding to the bank that stored the end of a first frame of data in a first buffer.
Figure 5C:
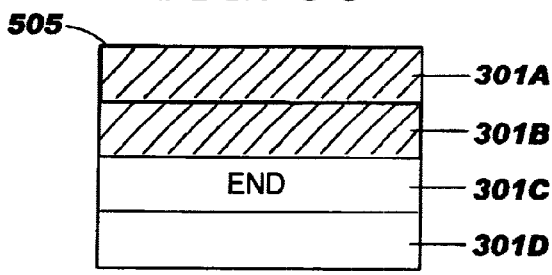
FIG. 5C illustrates another embodiment of the present invention of a reserved bank in a second buffer corresponding to the bank that stored the end of a first frame of data in a first buffer.
Figure 5D:
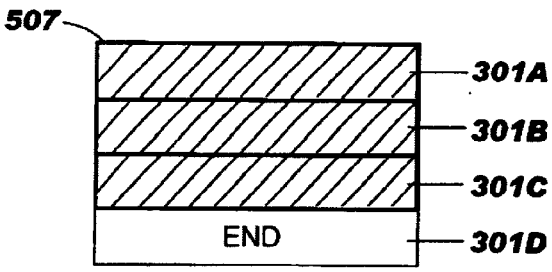
FIG. 5D illustrates another embodiment of the present invention of a reserved bank in a second buffer corresponding to the bank that stored the end of a first frame of data in a first buffer.

In step 404, a bank 301 is reserved in a second buffer 300 for storing frame modification information. The bank 301 of the second buffer 300 that is reserved is the bank corresponding to the bank 301 storing the end of the first frame of data in the first buffer 300 as illustrated in FIGS. 5A–5D. FIG. 5A illustrates an embodiment of the present invention where bank 301A of the first buffer 501 may store the end of the first frame of data. Subsequently, bank 301A of the second buffer 502 is reserved for storing frame modification information. FIG. 5B illustrates an embodiment of the present invention where banks 301A–B may store the ending of the first frame of data in the first buffer 503 and bank 301B of the first buffer 503 may store the end of the first frame of data. Subsequently, bank 301B of the second buffer 504 is reserved for storing frame modification information. FIG. 5C illustrates an embodiment of the present invention, where banks 301A–C may store the ending of the first frame of data in the first buffer 505 and bank 301C of the first buffer 505 may store the end of the first frame of data. Subsequently, bank 301C of the second buffer 506 is reserved for storing frame modification information. FIG. 5D illustrates an embodiment of the present invention where banks 301A–D may store the ending of the first frame of data in the first buffer 507 and bank 301D of the first buffer 507 may store the end of the first frame of data. Subsequently, bank 301D of the second buffer 508 is reserved for storing frame modification information.

In step 405, a determination is made as to whether or not the end of the first frame of data is stored in the last bank 301, i.e., bank 301D, of the buffer 300 storing the ending of the first frame of data.

If the end of the first frame of data is not stored in the last bank 301, i.e., bank 301D, of the first buffer 300, e.g., buffer 501, storing the ending of the first frame of data, then the second buffer 300, e.g., buffer 502, may be accessed to store the beginning frame data of a second frame in step 406. In one embodiment, the beginning frame data of a second frame may be stored in the one or more banks 301 following the bank 301 reserved for storing frame modification information in the second buffer 300. That is, the beginning frame data of a second frame may be stored in the banks 301 in the second buffer 300, e.g., buffer 502, following the bank 301, e.g., bank 301A of second buffer 502, corresponding to the bank 301, e.g., bank 301A of first buffer 501, storing the end of the first frame in the first buffer 300, e.g., buffer 501. Referring to FIG. 5A, the beginning frame data of a second frame may be stored in banks 301B–D of the second buffer 502 where the start of the second frame may be stored in bank 301B following bank 301A reserved for storing frame modification information. Referring to FIG. 5B, the beginning frame data of a second frame maybe stored in banks 301C–D of the second buffer 504 where the start of the second frame may be stored in bank 301C following bank 301B reserved for storing frame modification information. Referring to FIG. 5C, the start of the frame data of a second frame may be stored in bank 301D of the second buffer 506 following bank 301C reserved for storing frame modification information.

Figure 6:
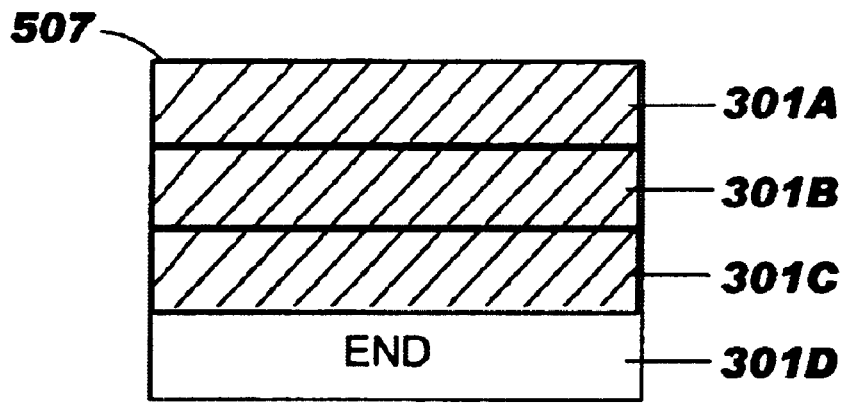
FIG. 6 schematically illustrates another buffer bank allocation in an embodiment of a memory in accordance with the present invention.
Figure 6:
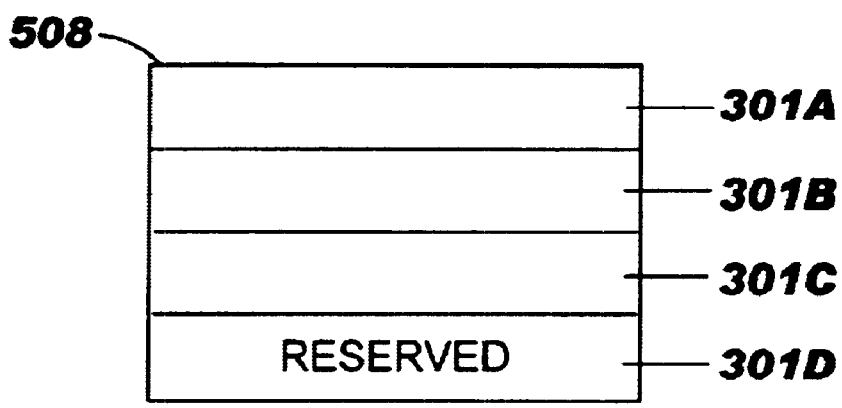
Figure 6:
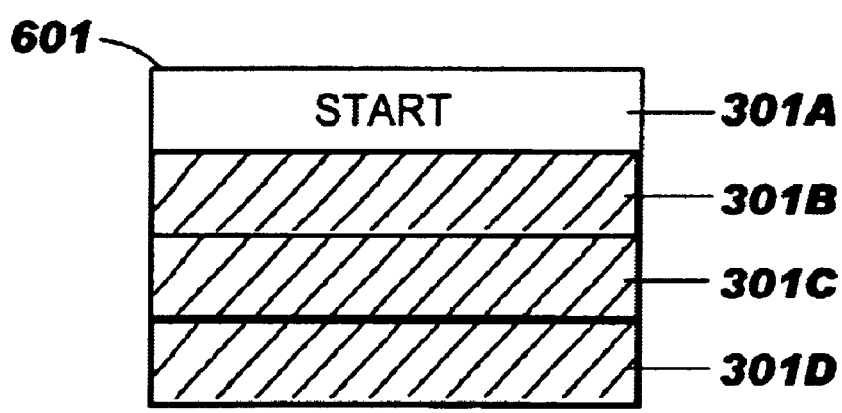

If the end of the first frame of data is stored in the last bank 301, i.e., bank 301D, of the buffer 300, e.g., buffer 507, storing the ending of the first frame of data, then a third buffer 300 may be accessed to store the beginning frame data of a second frame in step 407 in a second access. That is, in one access, the ending frame data of a first frame may be stored in a first buffer 300, e.g., buffer 507, with the end of the first frame being stored in the last bank 301, i.e., 301D, as well as reserving the corresponding last bank 301, i.e., 301D, in the second buffer 300, e.g., buffer 508. In the next access, receiver controller 203 may issue a write request to memory arbiter 204 to store the beginning frame data of a second frame in one or more banks 301, e.g. banks 301A–D, in a third buffer 300 of data storage unit 140 with bank 301A storing the start of the second frame as illustrated in FIG. 6. FIG. 6 illustrates an embodiment of the present invention where banks 301A–D store the ending of the first frame of data in the first buffer 507 and bank 301D of the first buffer 507 stores the end of the first frame of data. Subsequently, bank 301D of the second buffer 508 is reserved for storing frame modification information. During the next access of data storage unit 210, i.e., plurality of buffers 300, receiver controller 203 may store the beginning frame data of a second frame in one or more banks 301, e.g., banks 301A–D, in a third buffer 300, e.g., buffer 601, with bank 301A of the third buffer 300, e.g., buffer 601, storing the start of the second frame.

Referring to steps 406 and 407, upon completion of storing the ending frame data of a first frame and the beginning frame data of a second frame as well as reserving a bank 301 for storing the frame modification information, embedded processor logic 216 may be configured to write the frame modification information, e.g., frame modification commands, issued by embedded processor 150 in the bank 301 reserved for storing the frame modification information in step 408. As stated above, the frame modification information, e.g., frame modification commands, may be issued by embedded processor 150 to modify the processed frames temporarily stored in data preparation area memory 214. In one embodiment, the frame modification information, e.g., frame modification commands, may be commands to modify the frame starting at the succeeding bank 301 with respect to the bank 301 reserved for storing the frame modification information, e.g., decrementation of Time To Leave (TTL) counter in the Internet Protocol (IP)

header. For example, referring to FIG. 5A, bank 301A of the second buffer 300, e.g., buffer 502, may store commands to modify the second frame where the beginning of the second frame is stored in the one or more banks 301 in the second buffer 300, e.g., buffer 502, following the bank 301, e.g., bank 301A, reserved for storing the frame modification information. Referring to FIG. 6, bank 301D of the second buffer 300, e.g., buffer 508, may store commands to modify the second frame where the beginning of the second frame is stored in the one or more banks 301 in the third buffer 300, e.g., buffer 601.

Although the method and system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A system comprising:
    a processor configured to process frames of data, wherein said processor comprises:
        a data storage unit, wherein said data storage unit comprises a plurality of buffers, wherein said plurality of buffers are configured to store said frames of data, wherein each of said plurality of buffers comprises a plurality of banks, wherein a first bank in a first buffer stores an end of a first frame, wherein a second bank of a second buffer is reserved for storing frame modification information, wherein said second bank reserved for storing frame modification information corresponds to said first bank storing the end of said first frame.

2. The system as recited in claim 1, wherein if said first bank in said first buffer is not the last bank of said first buffer then said second buffer is accessed to store a beginning frame data of a second frame, wherein said second bank in said second buffer is located prior to a third bank in said second buffer configured to store a start of said second frame.

3. The system as recited in claim 2, wherein said first buffer stores an ending frame data of said first frame and said second buffer stores the beginning frame data of said second frame during one access to said data storage unit.

4. The system as recited in claim 1 further comprising:
    a data flow unit configured to receive and transmit said frames of data; and
    an embedded processor coupled to said data flow unit, wherein said embedded processor is configured to process said frames of data, wherein said embedded processor is configured to store said frame modification information in said second bank of said second buffer.

5. The system as recited in claim 1, wherein if said first bank in said first buffer is a last bank of said first buffer then a third buffer is accessed to store a beginning frame data of a second frame.

6. The system as recited in claim 5, wherein said first buffer stores an ending frame data of said first frame in a first access and said third buffer stores the beginning frame data of said second frame in a second access.

7. A method for reserving frame modification information in a data storage unit, wherein said data storage unit comprises a plurality of buffers, wherein said plurality of buffers is configured to store frames of data, wherein each of said plurality of buffers comprises a plurality of banks, the method comprising the steps of:
    accessing a first buffer in said data storage unit to store an ending frame data of a first frame, wherein a first bank in said first buffer stores an end of said first frame; and
    reserving a second bank in a second buffer of said data storage unit for storing frame modification information;
    wherein said second bank reserved for storing frame modification information corresponds to said first bank in said first buffer storing the end of said first frame.

8. The method as recited in claim 7, wherein if the end of said first frame is not stored in the last bank of said first buffer then the method comprises the step of:
    accessing said second buffer to store a beginning frame data of a second frame, wherein said second bank in said second buffer is located prior to a third bank in said second buffer configured to store a start of said second frame.

9. The method as recited in claim 8, wherein said first buffer stores the ending frame data of said first frame and said second buffer stores the beginning frame data of said second frame during one access to said data storage unit.

10. The method as recited in claim 8, further comprising the step of:
    storing said frame modification information in said second bank in said second buffer.

11. The method as recited in claim 7, wherein if the end of said first frame is stored in a last bank of said first buffer then the method comprises the step of:
    accessing a third buffer to store a beginning frame data of a second frame.

12. The method as recited in claim 11, wherein said first buffer stores the ending frame data of said first frame in a first access and said third buffer stores the beginning frame data of said second frame in a second access.

13. The method as recited in claim 11 further comprising the step of:
    storing said frame modification information in said second bank in said second buffer.

* * * * *